United States Patent [19]

Imai et al.

[11] 4,448,870

[45] May 15, 1984

[54] MAGNETIC COLOR TONER

[75] Inventors: Eiichi Imai, Narashino; Hitoshi Uchide, Yokohama; Kazunori Murakawa, Tokyo; Masaki Uchiyama, Tokyo; Hisayuki Ochi, Tokyo; Motoo Urawa, Funabashi; Seiichi Takagi, Tokyo; Yasuo Mitsuhashi, Yokohama, all of Japan

[73] Assignee: Canon Kabushiki Kaisha, Tokyo, Japan

[21] Appl. No.: 483,740

[22] Filed: Apr. 11, 1983

[30] Foreign Application Priority Data

Apr. 15, 1982 [JP] Japan .................................. 57-62855

[51] Int. Cl.[3] ........................ C01G 49/06; G03C 5/46

[52] U.S. Cl. ................................ 430/107; 252/62.54; 252/62.56; 430/106.6; 430/903

[58] Field of Search ..................... 252/62.56, 62.51 R, 252/62.54; 430/106.6, 903; 423/634, 633; 106/304

[56] References Cited

U.S. PATENT DOCUMENTS

| | | | |
|---|---|---|---|
| 4,121,931 | 10/1978 | Nelson | 96/1 SD |
| 4,254,203 | 5/1981 | Oka et al. | 252/62.54 |
| 4,256,818 | 5/1981 | Blossey et al. | 430/106.6 |
| 4,265,992 | 5/1981 | Kouchi et al. | 430/106.6 |
| 4,282,302 | 8/1981 | Makino et al. | 430/107 |
| 4,292,387 | 9/1981 | Kanbe et al. | 430/103 |

FOREIGN PATENT DOCUMENTS

| | | |
|---|---|---|
| 1203808 | 3/1973 | Fed. Rep. of Germany . |
| 2704361 | 7/1979 | Fed. Rep. of Germany . |
| 2006055 | 5/1979 | United Kingdom . |

*Primary Examiner*—John E. Kittle
*Assistant Examiner*—Mukund Shah
*Attorney, Agent, or Firm*—Fitzpatrick, Cella, Harper & Scinto

[57] ABSTRACT

Red to sepia magnetic toners stable to heat and light which do not fade or discolor for a long period of time are prepared by incorporating a partially α-transformed $\gamma$-$Fe_2O_3$ as a component in a toner.

7 Claims, 1 Drawing Figure

MAGNETIC COLOR TONER

BACKGROUND OF THE INVENTION

1. Field of the Invention

The present invention relates to a magnetic toner for use in electrophotography, electrostatic printing, magnetic recording, and the like, and particularly to a magnetic color toner for these purposes.

2. Description of the Prior Art

Electrophotography is an image forming process in which; an electrostatic latent images are formed by utilizing a photoconductor such as cadmium sulfide, polyvinylcarbazole, selenium, or zinc oxide, for instance, by affording uniform electric charge onto a photoconductive layer and subjecting the layer to image exposure; the electrostatic images thus formed are developed with a reverse-polarity charged toner; and if necessary, the toner images are transferred and fixed onto a transfer recording medium.

Electric printing, as disclosed in Japanese Patent Publication No. 14342/67 and in other literature, involves guiding an electrically charged toner powder to form toner images on a recording medium by utilizing electric field and fixing the images.

Electrostatic recording is a process in which electrostatic latent images are formed from information signals on a dielectric layer and developed with an electrically charged toner powder, and the resulting toner images are fixed.

Magnetic recording is a process in which magnetic latent images are formed similarly on a recording medium and developed with a magnetic material-containing toner powder, and the resulting toner images are transferred and fixed onto a transfer recording medium.

A variety of techniques are known to develop these electric or magnetic latent images with toners. The techniques are roughly classified into the dry development process and the wet development process. The former is further divided into a process employing a two-component developer composed of toner particles and carrier particles and a process employing a one-component developer which does not contain carrier particles.

Prevailing techniques belonging to the process employing a two-component developer are the magnetic brush process and the cascade process, which are different from each other in the type of carrier for carrying a toner, the former employing a powdered iron carrier and the latter employing a bead carrier.

There have been proposed a variety of processes which employ a one-component developer composed of a toner alone. Of these processes, many excellent processes employing a magnetic toner are in practical use, including the Magne-Dry process, which employs an electrically conductive toner; the process of DAS No, 2,704,361, which utilizes the dielectric polarization of toner particles; the process of U.S. Pat. No. 4,121,931 in which electric charge is transferred by agitation of a toner; and the processes of U.S. Ser. Nos. 938,101 and 58,434, offered by the present applicant, in which latent images are developed with toner particles flying toward them.

On the other hand, the purpose of recording or copying has been diversified recently and a color copying machine compact and inexpensive is desired which is capable of forming images of different colores according to requests. In the one-component magnetic toners mentioned above, magnetite or ferrite has been used conventionally as the magnetic material. Its color, being black or dark brown, is a great obstruction to the preparation of a so-called color toner though effective for a black toner. In order to surmount this obstruction, whitening or coloring of black magnetic materials has been proposed. However, these proposed methods are not only insufficient for masking the magnetic material and forming an image of intended color, but also unsatisfactory in various practical characteristics of the toner for performing electrophotography, including initial stage properties such as developing ability, transferability, fixability, and cleaning ability and long-term properties such as durability, environmental stability, and preservability.

SUMMARY OF THE INVENTION

An object of this invention is to provide a red to sepia magnetic toner overcoming the above noted deficiencies and giving clear colored images.

Another object of this invention is to provide a magnetic color toner excellent in developing ability, transferability, fixability, and cleaning ability.

Another object of this invention is to provide a magnetic color toner excellent in durability for repeated developments and in stability to changes in environmental conditions.

Another object of this invention is to provide a magnetic color toner which is stable to heat and light and does not fade or discolor over a long period of time.

According to the present invention, there is provided a magnetic color toner comprising partially $\alpha$-transformed $\gamma$-$Fe_2O_3$ particles as magnetic particles.

Preferred embodiments of the magnetic color toner of this invention comprise at least magnetic particles and a binder, wherein said magnetic particles are contained in amounts of 20–100 parts, particularly 40–80 parts, by weight based on 100 parts by weight of said binder and contains at least 60% by weight of said partially $\alpha$-transformed $\gamma$-$Fe_2O_3$ particles, and the $\alpha$-$Fe_2O_3$ content in $Fe_2O_3$ is 1–50%, particularly 3–30%, by weight.

DETAILED DESCRIPTION OF PREFERRED EMBODIMENTS OF THE INVENTION

Figure 1:
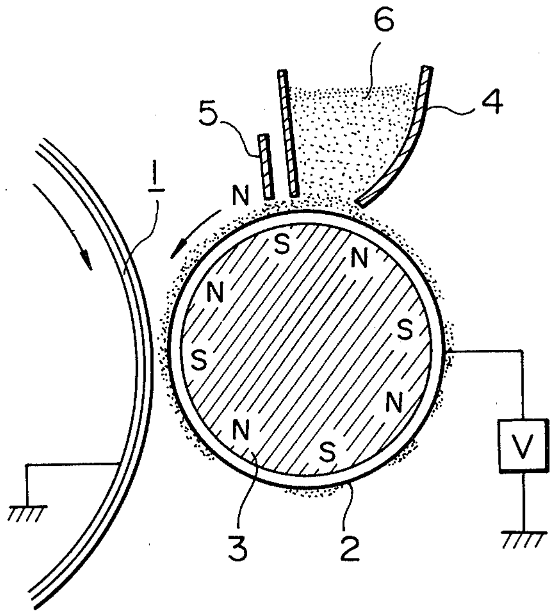
FIG. 1 is a cross-sectional view of an arrangement for carrying out a development process to which the toner of this invention is adaptable.

The partially $\alpha$-transformed $\gamma$-$Fe_2O_3$ can be prepared by (1) neutralizing an iron sulfate or iron chloride solution with alkali, oxidizing the resultant with heat to form once $Fe_3O_4$, and further oxidizing this $Fe_3O_4$, (2) coprecipitating $Fe_3O_4$ from a ferrous salt-ferric salt solution with alkali, and oxidizing the resulting $Fe_3O_4$, or the like. In these processes, by controlling operational conditions for the oxidation of $Fe_3O_4$, it is possible to produce $Fe_2O_3$ containing a desired amount of $\alpha$-$Fe_2O_3$. The $\alpha$-$Fe_2O_3$ content in the whole $Fe_2O_3$ of this invention is 1–50%, particularly 3–30%, by weight. This content can be determined by measuring a magnetic property of the whole $Fe_2O_3$ since $\alpha$-$Fe_2O_3$ has no ferromagnetism. The $Fe_2O_3$ obtained in the above way may be treated with a surface property improver selected from various coupling agents and the like, if necessary.

The partially $\alpha$-transformed $\gamma$-$Fe_2O_3$ particles, presenting a red-brown hue, are very favorable as a magnetic material for a red or sepia color magnetic toner, permitting reduction of the amount of colorant jointly used to zero or a minimum according to circumstances. As the $\alpha$-$Fe_2O_3$ content increases, the color of the toner becomes better but adverse effects become remarkable because $\alpha$-$Fe_2O_3$ has no ferromagnetism. Thus, there exists the above-defined suitable range of $\alpha$-$Fe_2O_3$ content.

The partially $\alpha$-transformed $\gamma$-$Fe_2O_3$ is so stable to light and heat that color images developed with a color magnetic toner containing this as a magnetic component do not fade or discolor over a long period of time. In addition, this material has a high electric resistance as compared with $Fe_3O_4$, giving favorable results in particular when used in an insulating magnetic color toner. The resulting toner is excellent in triboelectric chargeability and triboelectricity retaining ability and has improved developing ability, transferability, and durability, thus forming good quality images with high optical density.

Moreover, the magnetic toner containing the partially $\alpha$-transformed $\gamma$-$Fe_2O_3$ particles is effective for preventing a so-called image running which may take place on a latent-image bearing surface. This image running is generally considered to result from the adhesion to said surface of some substance such as $O_3$ or NOx generated by corona discharge or from the deterioration of the surface itself by corona discharge or the like. The small amount of $\alpha$-$Fe_2O_3$ contained in the toner of this invention possibly clean such a contaiminant or deteriorated portions by polishing the surface, thereby maintaining the surface so as to give good image quality during repeated survice operations.

The toner of this invention using partially $\alpha$-transformed $Fe_2O_3$ particles further exhibits good characteristics resisting changes in environmental conditions. For instance, the following phenomenon can be inhibited in the case of this toner to a considerable extent: when magnetic toner particles are brought into a low free flow state by high humidity environmental conditions or other cause, agglomeration of toner particles is caused by uneven distribution of the toner composition, particularly of the magnetic particles; the resulting agglomerate cannot be thoroughly broken up with magnetic force, thus resulting in the deterioration of image quality and the reduction of image density. It is not clear why this phenomenon is considerably inhibited in the case of this toner, but this seems to be caused by the properties of the partially $\alpha$-transformed $\gamma$-$Fe_2O_3$ particles more wettable with binders as compared with magnetic particles conventionally used and hence better dispersible in the binder used.

In the toner of this invention, it is possible to use, jointly with the partially $\alpha$-transformed $\gamma$-$Fe_2O_3$ particles, any other magnetic particles selected from $Fe_3O_4$ particles of relatively large particle sizes, various metal ferrites particles, iron powder, and the like, wherein the content of the other magnetic particles or powder is desired not to exceed 40% by weight of the whole magnetic material.

In the toner of this invention, various colorants having a desired hue from red to brown can be incorporated, if necessary.

Binders acceptable in the toner of this invention include homopolymers and copolymers of styrene and its substitution products, such as polystyrene, poly(p-chlorostyrene), polyvinyltoluene, styrene-p-chlorostyrene copolymer, styrene-vinyltoluene copolymer, and the like; styrene-acrylic acid ester copolymers such as styrene-methyl acrylate copolymer, styrene-ethyl acrylate copolymer, styrene-n-butyl acrylate copolymer, and the like; styrene-methacrylic acid ester copolymers such as styrene-methyl methacrylate copolymer, styrene-ethyl methacrylate copolymer, styrene-n-butyl methacrylate copolymer, and the like; styrene-acrylic acid ester-methacrylic acid ester multipolymers; copolymers of styrene and other ethyenic unsaturated monomers, such as styrene-acrylonitrile, styrene-vinyl methyl ether, styrene-butadiene, styrene-vinyl methyl ketone, styrene-acrylonitrile-indene, and styrene-maleic acid ester copolymers, and the like; and other resins such as poly(methyl methacrylate), poly (butyl methacrylate), poly(vinyl acetate), polyesters, polyamides, epoxy resins, poly(vinyl butyral), poly (acylic acid), phenolic resins, aliphatic or alicyclic hydrocarbon resins, petroleum resin, chlorinated paraffin, etc. These binders may be used alone or in combination. Binders for the toner used in the pressure fixing system include low molecular weight polyethylene, low molecular weight polypropylene, ethylene-vinyl acetate copolymer, ethylene-acrylic acid ester copolymers, higher fatty acids, polyamides, polyesters, etc. These binders can also be used alone or in combination.

Some additives can be incorporated, if necessary, in the toner of this invention. Such additives include lubricants, fixing aids such as low molecular weight polyethylene, flow improvers or anti-caking agents such as collidal silica, and metal oxides such as tin oxide as conductivity doners.

The magnetic toner of this invention can be produced, for instance, by the following processes:

(1) Necessary components are throughly kneaded with heating by means of a heat roll mill, kneader, extruder, or the like and subjected to mechanical grinding and classification.

(2) Materials including a magnetic powder are dispersed in a binder solution, and the resulting dispersion is spray dried.

(3) Prescribed materials are mixed with the monomer which constitutes the binder resin and the resulting suspension is subjected to polymerization.

Developments of latent images with the toner of this invention can be accomplished by known processes, including the process of U.S. Pat. No. 3,909,258 wherein a conductive magnetic toner is used, the process of Japanese Patent Kokai Nos. 42141/'79 and 18656/'80 wherein an insulating magnetic toner is used, and the so-called micro-toning development process of Japanese Patent Kokai Nos. 83630/'78 and 24632/'79 wherein a developer comprising a magnetic toner and a non-magnetic toner is used. Among these processes, the second process employing an insulating magnetic toner is particularly favorable. According to this process, an electrostatic-image bearing member and a developer carrying member are opposed with a definite clearance being kept between them, and insulating magnetic developer is applied onto the surface of the developer carrying member to a thickness less than said clearance and is transferred onto the surface of said electrostatic-image bearing member to develop the image.

This invention will be illustrated in further detail by the following examples: All parts and percentages in the following compounding formulations are by weight.

EXAMPLE 1

A mixture of the following composition was kneaded by means of a roll mill at 150° C., and after cooling, the resulting mass was coarsely crushed with a speed mill and then finely pulverized with a jet mill. The powder was classified with an air classifier, giving a sepia magnetic toner of particle sizes 5–20μ.

| Composition | |
|---|---|
| (1) Styrene-butadiene-dimethylaminoethyl methacrylate copolymer (60:26:4) | 80 parts |
| (2) Styrene-butyl acrylate copolymer (60:40) | 20 parts |
| (3) $Fe_2O_3$ particles containing 10% of $\alpha$-$Fe_2O_3$ and 90% of $\gamma$-$Fe_2O_3$ | 60 parts |

An image formation test of this sepia toner was conducted by using an apparatus as shown in FIG. 1, in the following manner: Negative-electrostatic latent images were formed on a well-known zinc oxide photosensitive layer laid on a drum 1. A sleeve 2 provided with magnets therein was placed close to the photosensitive drum 1 as shown in FIG. 1 so as to keep the distance from the drum 1 at 0.25 mm (the drum and the sleep rotate in opposite directions at the same peripheral speed, but the magnets 3 do not rotate; surface magnetic flux density: 700 gauss; distance between a blade knife 5 and the sleeve surface: 0.2 mm). The latent images were developed with the sepia magnetic toner by applying a 1.2-KHz A.C. voltage of 1.2 KV and a D.C. bias of −150 V to the sleeve 2. Then, the resulting toner images were transferred onto transfer paper by exposing the back side of the transfer paper to a corona of D.C. −7 KV. The transferred images were fixed by using a commercial plain-paper copying machine (tradename: NP-200J, mfd. by Canon Inc.). The toner remaining on the photosensitive drum 1 after transferring was cleaned with a magnetic brush cleaner. The copies obtained in this way exhibited clear, fog-free, firmly fixed images having a subdued sepia color. The images indicated no fading or discoloration during a long-term Fade-O-Meter exposure test.

EXAMPLE 2

A sepia color toner was prepared from a mixture of the following composition in the same manner as in Example 1:

| Composition | |
|---|---|
| (1) Styrene-butadiene copolymer (70:30) | 100 parts |
| (2) Chromium complex salt of 3,5-di-t-butyl salicylate | 2 parts |
| (3) $Fe_2O_3$ particle containing 3% of $\alpha$-$Fe_2O_3$ and 97% of $\gamma$-$Fe_2O_3$ | 70 parts |
| (4) Polyethylene | 3 parts |

An image forming test of the sepia magnetic toner obtained was conducted by using a commercial copying machine (the same that used for fixing in Example 1), giving sepia color images of high quality having a sufficient density for practical use and also sharp letters. Further, a test of reproducting 10,000 copies with the toner was conducted to examine its durability. As the result, no particular defect was found in the image quality throughout the test period including the time for toner supplement.

EXAMPLE 3

A durability test of continuous reproduction of 5,000 copies was made on the toner of Example 1 using a copying machine provided with an organic photoconductive member under high temperature and humidity conditions of 30° C. and 90% R.H. The results indicated no substantial reduction in image density or deterioration of image quality so-called image running.

EXAMPLE 4

A red magnetic toner of the following composition was prepared and tested in the same manner as in Example 1. The resulting color and image quality were similarly good.

| Composition | |
|---|---|
| (1) Styrene-butadiene-dimethylaminoethyl methacrylate copolymer (60:26:4) | 80 parts |
| (2) Styrene-butyl acrylate copolymer (60:40) | 20 parts |
| (3) $Fe_2O_3$ particle containing 30% of $\alpha$-$Fe_2O_3$ and 70% of $\gamma$-$Fe_2O_3$ | 50 parts |
| (4) $Fe_3O_4$ of particle sizes about 1–2μ | 20 parts |
| (5) red rhodamine group dye | 2 parts |

EXAMPLE 5

A red magnetic toner of the follow composition was prepared and tested in the same manner as in Example 1. The resulting color and image quality were similarly good.

| Composition | |
|---|---|
| (1) Styrene-butadiene-dimethylaminoethyl methacrylate copolymer (60:26:4) | 100 parts |
| (2) $F_2O_3$ particle containing 3% of $\alpha$-$Fe_2O_3$ and 97% of $\gamma$-$Fe_2O_3$ | 80 parts |
| (3) red rhodamine group dey | 3 parts |

What we claim is:

1. A magnetic color toner containing a magnetic material and a binder, said magnetic material comprising magnetic particles comprising a mixture of $\alpha$-$Fe_2O_3$ and $\gamma$-$Fe_2O_3$ 2. The magnetic color toner of claim 1, wherein the amount of said magnetic material is 20–100 parts by weight to 100 parts by weight of said binder.

3. The magnetic color toner of claim 1, wherein the $\alpha$-$Fe_2O_3$ content in said magnetic material is 1–50% by weight.

4. The magnetic color toner of claim 1, wherein the content of said magnetic particles in the entire magnetic material is at least 60% by weight.

5. The magnetic color toner of claim 1, which additionally contains a colorant in amounts sufficient to provide a hue from red to sepia.

6. The magnetic color toner of claim 1, wherein said magnetic particles are prepared by neutralizing an iron sulfate or iron chloride solution with alkali, oxidizing the resultant with heat, and further oxidizing the resulting $Fe_3O_4$.

7. The magnetic color toner of claim 1, wherein said magnetic particles are prepared by oxidizing the $Fe_3O_4$ coprecipitated from a solution of a ferrous salt-ferric salt mixture.

* * * * *